US007362029B2

(12) United States Patent
Baempfer et al.

(10) Patent No.: US 7,362,029 B2

(45) Date of Patent: Apr. 22, 2008

(54) FUEL PUMP COMPRISING AN ELECTRIC MOTOR

(75) Inventors: Michael Baempfer, Rotenburg (DE); Wolfgang Warnke, Herleshausen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/552,929

(22) PCT Filed: Mar. 15, 2004

(86) PCT No.: PCT/EP2004/002679

§ 371 (c)(1), (2), (4) Date: Oct. 11, 2005

(87) PCT Pub. No.: WO2004/093296

PCT Pub. Date: Oct. 28, 2004

(65) Prior Publication Data

US 2006/0208599 A1 Sep. 21, 2006

(30) Foreign Application Priority Data

Apr. 16, 2003 (DE) ............................... 103 17 594

(51) Int. Cl.
*H01R 39/08* (2006.01)

(52) U.S. Cl. ....................... 310/233; 310/237; 310/248

(58) Field of Classification Search ................ 310/233, 310/237, 248, 251–253

See application file for complete search history.

(56) References Cited

U.S. PATENT DOCUMENTS

| | | | | |
|---|---|---|---|---|
| 2,828,432 | A | 3/1958 | Rich | |
| 3,042,822 | A * | 7/1962 | Savage et al. | 310/228 |
| 5,744,889 | A * | 4/1998 | Niimi | 310/239 |
| 6,218,761 | B1 * | 4/2001 | Richter et al. | 310/264 |
| 6,268,679 | B1 | 7/2001 | Reynvaan et al. | |
| 6,528,923 | B2 * | 3/2003 | Katoh et al. | 310/251 |
| 6,552,466 | B2 | 4/2003 | Schwabbauer et al. | |
| 6,578,681 | B1 * | 6/2003 | Raad | 188/267 |
| 2001/0006315 | A1 | 7/2001 | Schwabbauer et al. | |

FOREIGN PATENT DOCUMENTS

| | | | |
|---|---|---|---|
| DE | 1 096 479 | B | 1/1961 |
| DE | 6 751 624 | U | 2/1969 |
| EP | 0 395 515 | A1 | 10/1990 |
| EP | 0 405 173 | A2 | 1/1991 |
| EP | 1 091 473 | A2 | 4/2001 |
| EP | 1 111 735 | A2 | 6/2001 |
| GB | 1 476 527 | A | 6/1977 |
| JP | 2001268983 | | 9/2001 |
| JP | 2001275327 | | 10/2001 |

* cited by examiner

*Primary Examiner*—Dang Le

(74) *Attorney, Agent, or Firm*—Cohen Pontani Lieberman & Pavane LLP

(57) ABSTRACT

The invention relates to a fuel pump which comprises an electric motor. Said electric motor is provided with carbon brushes (11) that cover a plurality of lamellae (17) of a collector (9). Grooves (7) in an armature (6) include sections of a plurality of coils (8), thereby particularly reducing erosion of the carbon brushes (11).

1 Claim, 1 Drawing Sheet

9 6 4 7 18 12 17

FUEL PUMP COMPRISING AN ELECTRIC MOTOR

BACKGROUND OF THE INVENTION

The invention relates to a fuel pump comprising an electric motor which has a commutator having a plurality of laminates and carbon brushes which slide over the laminates, and which has turns which are electrically connected to individual laminates and are arranged in slots in an armature.

Fuel pumps of this type are frequently used in modern motor vehicles having 12-volt on-board electrical systems and are known in practice. The electric motors of the known fuel pumps are so-called permanently excited, commutator DC motors. In this case, the number of coils corresponds to twice the number of slots in the armature. A stator which surrounds the armature has permanent magnets. A respective end of each of the laminates is connected to two coils. The carbon brushes each make contact with one laminate on opposite sides of the commutator. The fuel pump is usually arranged with the electric motor inside a fuel container, with the result that replacing the carbon brushes involves a very great deal of effort.

One disadvantage of the known fuel pumps is that the service life of the electric motor, particularly in the case of voltages higher than 12 volts, is very limited. For example, the service life of the carbon brushes is reduced by 90% when changing over to a 42-volt on-board electrical system.

A voltage regulator could be connected upstream of the electric motor in order to limit the voltage to 12 volts. However, this leads to great outlay for supplying electrical power to the electric motor.

Furthermore, the number of laminates and thus the number of turns could be multiplied. However, this also leads to great structural outlay on the fuel pump.

The invention is based on the problem of designing a fuel pump of the type mentioned in the introduction in such a way that the longest possible service life of the carbon brushes is ensured, even with voltages higher than 12 volts.

BRIEF DESCRIPTION OF THE INVENTION

According to the invention, this problem is solved in that a plurality of laminates are covered by one carbon brush in each case in each rotary position of the commutator in relation to the carbon brushes.

This design means that the electrical power conducted to the commutator by the carbon brush is distributed among a plurality of laminates. In addition, a laminate is shorted and thus contributes to extinguishing the brush spark and reducing erosion. The carbon brushes have a large cross section. This respectively leads to a reduction in wear of the carbon brushes and thus to said carbon brushes having particularly long service lives. The fuel pump according to the invention can therefore be operated at a particularly high voltage of 42 volts, for example. In the simplest case, the electric motor according to the invention does not require any more components than the known electric motor and can therefore be produced in a cost-effective manner.

The structural design of the fuel pump according to the invention is particularly simple when each of the carbon brushes is as wide as two laminates plus a single insulation layer between the laminates. In this case, it is usually sufficient for said relationship to be maintained with an accuracy of approximately 10%.

According to another advantageous development of the invention, the design of the electric motor is particularly compact when the number of laminates of the commutator corresponds to a multiple of the number of slots, and when a plurality of half-coils are arranged in a single slot in accordance with the multiple of the number. The commutator preferably has twice as many laminates as the armature has slots. In this case, each slot contains two coils. The ends of the turns are then each individually connected to opposite laminates.

According to another advantageous development of the invention, a contribution is made to further reducing the erosion of the carbon brushes when the carbon brush for operating the electric motor at 42 volts has a resistivity of 300 to 400 μOm. The resistivity is preferably 350 μOm. The carbon brush for operating the electric motor at 42 volts therefore has a resistivity which is approximately ten times higher than that of a carbon brush for operating at 12 volts.

According to another advantageous development of the invention, the carbon brushes are able to make contact with the laminates over a particularly large area when the carbon brushes which are axially prestressed on a disk-like commutator have a trapezoidal cross section and are arranged with the narrow end close to a shaft of the electric motor. This means that the current density in the carbon brushes is kept particularly low.

BRIEF DESCRIPTION OF THE DRAWINGS

The invention permits numerous embodiments. In order to further explain the basic principle of the invention, one of said embodiments is described below and illustrated in the drawing, in which.

DETAILED DESCRIPTION OF THE INVENTION

Figure 1:
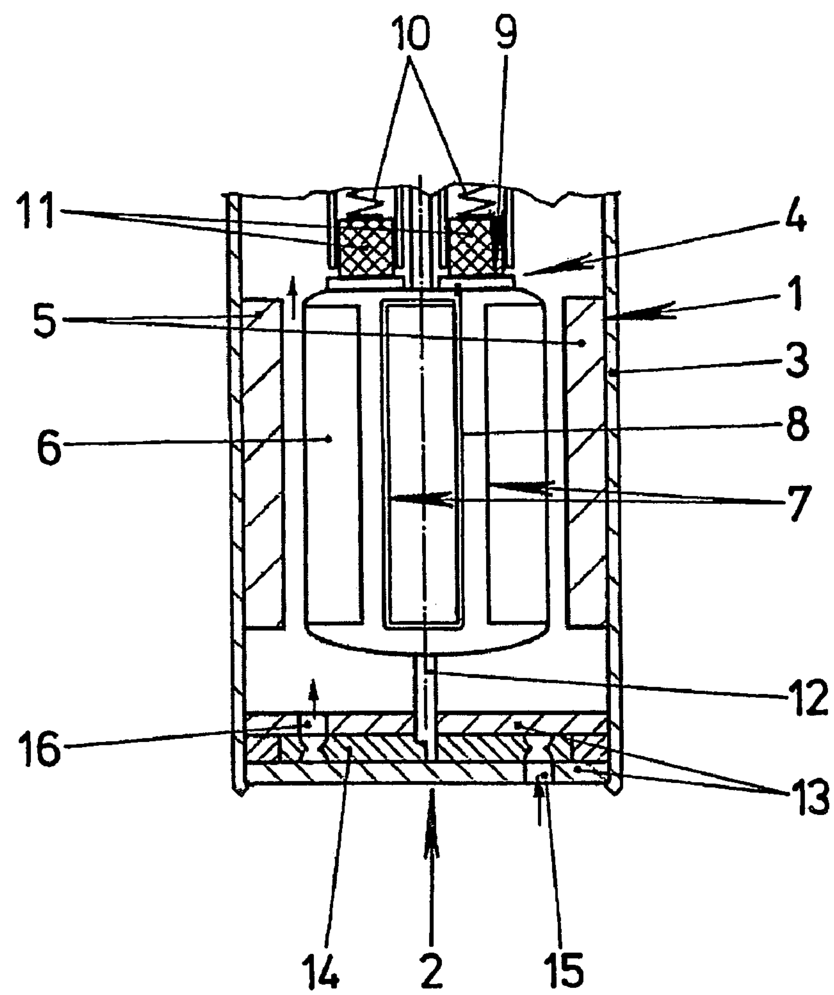
FIG. 1 schematically shows a sectional illustration through a fuel pump according to the invention.

FIG. 1 shows a fuel pump of a motor vehicle having a feed pump 2 which is driven by an electric motor 1 and has a housing 3. The electric motor 1 has a rotor 4 which is opposite a permanent magnet 5 arranged on the housing 3 with a small distance in between. The rotor 4 has an armature 6 having a plurality of slots 7 for holding coils 8 through which electrical power flows. The half-coils 8 each extend beyond a slot 7, with two coils lying one above the other in each case. A single coil is illustrated to represent a plurality of coils 8 of the armature. A disk-like commutator 9 is arranged at one end face of the rotor 4. Two carbon brushes 11 which are prestressed by spring elements 10 slide over the commutator 9. The commutator 9 and the armature 6 are arranged on a shaft 12 such that they cannot rotate. In order to simplify the drawing, bearings of the shaft 12 are not illustrated. The feed pump 2 has an impeller 14 which is arranged on the shaft 12, can rotate between housing parts 13, and is in the form of a side-channel pump through which fuel flows axially. The feed pump 2 conveys fuel from an inlet channel 15 to an outlet channel 16 arranged on the side of the electric motor 1. The fuel therefore flows through the electric motor 1. For explanatory reasons, the flow of fuel is indicated by arrows in the drawing. On that side of the fuel pump which is remote from the feed pump 2, said fuel pump has a connection (not illustrated) for a feed line which leads to an internal combustion engine of the motor vehicle.

Figure 2:
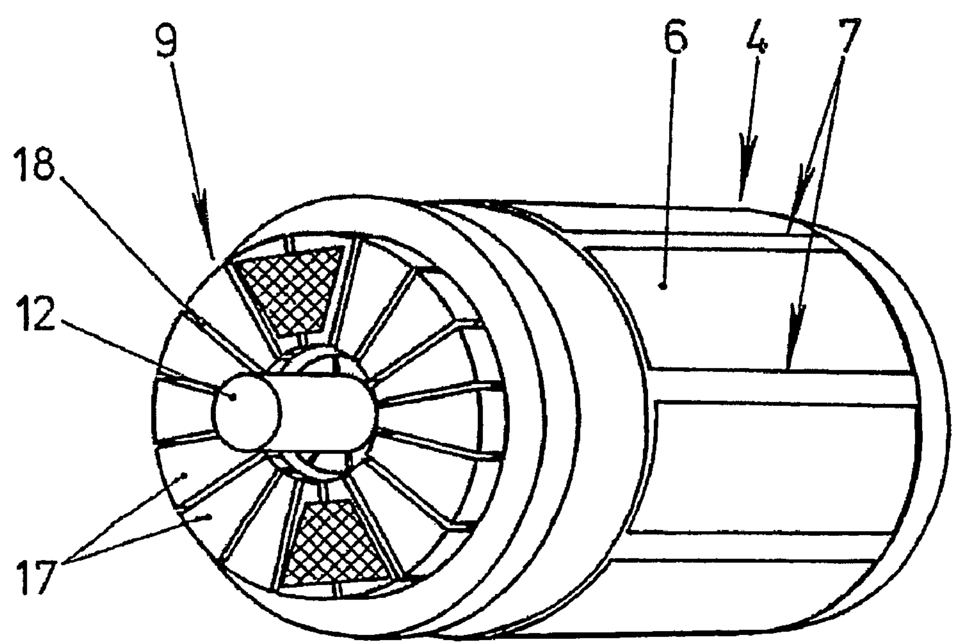
FIG. 2 shows a perspective illustration of a rotor of an electric motor of the fuel pump according to the invention from FIG. 1 on an enlarged scale.

FIG. 2 shows a perspective view of the rotor 4 in a view looking at the commutator 9. It can be seen here that the commutator 9 has a plurality of laminates 17 which are electrically separated from one another by insulation layers 18 in each case. Furthermore, the regions of the commutator 9 which are covered by the carbon brushes 11 from FIG. 1 are shown hatched. It can be seen here that the carbon brushes 11 each have a trapezoidal cross section and are arranged with their narrow end close to the shaft 12. The carbon brushes 11 are also as wide as two laminates 17 plus a single insulation layer 18, with the result that at least two laminates 17 are covered by each of the carbon brushes 11 in each rotary position of the commutator 9. The commutator 9 has sixteen laminates 17 in total, while the armature 6 has eight slots 7 for holding coils 8 which are connected to the laminates 17 and are illustrated in FIG. 1. Since two half-coils 8 are arranged one above the other in each of the slots 7, the armature 6 with eight slots 7 has a total of sixteen coils 8 whose ends are each connected to opposite laminates.

The invention claimed is:

1. A fuel pump comprising an electric motor for operation at 42 volts which has a commutator having a plurality of laminates (17) and carbon brushes (11) which slide over the laminates, and which has coils which are electrically connected to individual laminates and are arranged in slots in an armature, characterized in that: the carbon brushes (11) have identical trapezoidal sections and the laminates (17) have identical trapezoidal sections, with each of the carbon brushes (11) being as wide as two laminates (17) plus a single insulation layer (18) between the laminates (17) and with the carbon brushes (11) and the laminates (17) having corresponding sides that have substantially the same angle of inclination, and the brushes (11) are axially prestressed on a disk-like commutator (9) and are positioned with the narrow end of the trapezoid adjacent to a shaft (12) of the electric motor (2) and an impeller is coupled to the shaft, and wherein at least the commutator and brushes of the electric motor are disposed within a housing of the fuel pump and within a path of fuel which is advanced through the housing by the impeller and the carbon brushes (11) have a resistivity of 300 to 400 μOm.

* * * * *